US011502989B2

(12) United States Patent
Marriott et al.

(10) Patent No.: US 11,502,989 B2
(45) Date of Patent: Nov. 15, 2022

(54) METHOD OF CONFIGURING A STORAGE SYSTEM

(71) Applicant: SUPPLY POINT SYSTEMS LIMITED, Rugby (GB)

(72) Inventors: Christopher Marriott, Rugby (GB); Christopher Benwell, Rugby (GB); Robert Bunce, Rugby (GB)

(73) Assignee: Supply Point Systems Limited

( * ) Notice: Subject to any disclaimer, the term of this patent is extended or adjusted under 35 U.S.C. 154(b) by 97 days.

(21) Appl. No.: 16/977,539

(22) PCT Filed: Jan. 22, 2019

(86) PCT No.: PCT/GB2019/050165
§ 371 (c)(1),
(2) Date: Sep. 2, 2020

(87) PCT Pub. No.: WO2019/171016
PCT Pub. Date: Sep. 12, 2019

(65) Prior Publication Data
US 2020/0403966 A1    Dec. 24, 2020

(30) Foreign Application Priority Data

Mar. 9, 2018    (GB) .................................... 1803798

(51) Int. Cl.
| G06F 15/177 | (2006.01) |
| H04L 61/5038 | (2022.01) |
| A47B 88/457 | (2017.01) |
| G07F 11/18 | (2006.01) |
| G07F 11/62 | (2006.01) |

(Continued)

(52) U.S. Cl.
CPC ........ *H04L 61/5038* (2022.05); *A47B 88/457* (2017.01); *G07F 11/18* (2013.01); *G07F 11/62* (2013.01); *G07F 17/12* (2013.01); *H04L 61/5046* (2022.05)

(58) Field of Classification Search
None
See application file for complete search history.

(56) References Cited

U.S. PATENT DOCUMENTS

| 4,814,742 A | 3/1989 | Morita et al. |
| 6,654,382 B1 | 11/2003 | Bare et al. |

(Continued)

FOREIGN PATENT DOCUMENTS

| CN | 101739012 B | * | 8/2011 | .............. Y02P 90/02 |
| DE | 102010040575 A1 | | 3/2012 | |

(Continued)

OTHER PUBLICATIONS

Great Britain Search Report for Great Britain Application No. GB1803798.6, dated Aug. 23, 2018, 4 pages.

(Continued)

*Primary Examiner* — Phyllis A Book
(74) *Attorney, Agent, or Firm* — RatnerPrestia

(57) ABSTRACT

A method of configuring a storage system includes the steps of: sending a command to one or more units in the electronic system to enter into an address setting mode; generating a signal for a user to identify units that have entered the address setting mode; and setting up an address for a unit based on an input received from the user.

19 Claims, 6 Drawing Sheets

(51) Int. Cl.
*G07F 17/12* (2006.01)
*H04L 61/5046* (2022.01)

(56) References Cited

U.S. PATENT DOCUMENTS

| | | | | |
|---|---|---|---|---|
| 8,628,006 B1* | 1/2014 | Gromley | ................... | E05G 1/04 |
| | | | | 235/382 |
| 2007/0150092 A1* | 6/2007 | Ohmura | ................ | G07F 7/1025 |
| | | | | 700/231 |
| 2008/0276074 A1* | 11/2008 | Luick | .................... | G06F 9/3834 |
| | | | | 712/216 |
| 2009/0210089 A1* | 8/2009 | Christie | ................ | G16H 20/13 |
| | | | | 700/244 |
| 2010/0030667 A1* | 2/2010 | Chudy | ................... | G06Q 10/08 |
| | | | | 705/28 |
| 2010/0261458 A1* | 10/2010 | Del Gallo | ........... | G06F 3/03545 |
| | | | | 715/224 |
| 2012/0158606 A1* | 6/2012 | Moudy | ................ | G06Q 10/083 |
| | | | | 705/332 |
| 2012/0232689 A1 | 9/2012 | Buchmann et al. | | |
| 2012/0310410 A1* | 12/2012 | Adams | ...................... | G07F 5/18 |
| | | | | 700/237 |
| 2013/0238987 A1* | 9/2013 | Lutwyche | ............ | G06Q 50/184 |
| | | | | 715/256 |
| 2014/0191633 A1 | 7/2014 | Zhu et al. | | |
| 2015/0179006 A1* | 6/2015 | Von Zurmuehlen | .... | G07F 17/12 |
| | | | | 340/5.54 |
| 2017/0126014 A1 | 5/2017 | Hsieh et al. | | |

FOREIGN PATENT DOCUMENTS

| | | | | |
|---|---|---|---|---|
| GB | 2571779 A | * | 9/2019 | ........... A47B 88/457 |
| WO | WO-2008006611 A3 | * | 2/2008 | ........... G06F 17/243 |

OTHER PUBLICATIONS

International Search Report and Written Opinion for international Application PCT/GB2019/050165, dated Apr. 16, 2019, 9 pages.

* cited by examiner

METHOD OF CONFIGURING A STORAGE SYSTEM

CROSS REFERENCE TO RELATED APPLICATIONS

This is a U.S. National Phase application of PCT/GB2019/050165, filed Jan. 22, 2019, which claims priority to Great Britain Patent Application No. 1803798.6, filed Mar. 9, 2018, the disclosures of each of these applications being incorporated herein by reference in their entireties for all purposes.

FIELD OF THE INVENTION

The present invention relates to configuring storage systems and other systems. In one aspect, it relates to setting up an address for storage units in electronic stock control systems well-known for use, for example, in manufacturing and medical facilities or as vending machines.

BACKGROUND

In typical automated stock control systems, a storage cabinet comprises a plurality of latched drawers held between panels fixed between support beams. Articles to be supplied to users are provided in the drawers or compartments of the drawers. Examples of such articles include cutting tools and the like used with machine tools; other manufacturing tools and components; drugs, needles and other medical items; and legal documents. A control system allows a user to access the required article by unlatching the drawer containing the required article. The drawer is then pulled out from the home position (where no compartments are exposed) to the extent that the compartment containing the article is exposed, when the drawer is latched again to prevent further opening of the drawer.

In a known system, each panel is centrally connected to a system controller which sends commands for both operation and maintenance of the panels. The panels in the same row are provided on the same bus and are addressed using multi-drop communications. In other words, the system controller broadcasts the same command to all the panels on the bus, but the command includes the address of the panel for which the command is intended.

Each panel in such a system is addressed manually using a set of jumpers, in which a set of pins is connected to each other in a unique arrangement, to identify the panel. This makes the assembly process difficult and leads to problems when it is needed to replace the panel and use the same jumper arrangement as on the original panel. If a wrong jumper arrangement is used, it can be very hard to diagnose.

It is known for electronic systems to include a plurality of controllers that can self-diagnose/self-test and carry out the operations requested by the system controller. When the system controller broadcasts a command, the respective controllers on the panels check to see whether their address matches that of the address sent by the system controller. If it does not, it ignores the command; if it does, it operates based on the command. However, this approach requires the address to be pre-set for each controller. Such an arrangement presents difficulties in a configurable system in which any controller is desired to be fitted in any position, both when it is assembled in the first place and when it is reconfigured. To provide each controller with a pre-set address matching the intended physical position in the system is expensive and makes the assembly difficult and error prone. Moreover, this also requires a stock of spare parts with controllers with pre-set addresses.

SUMMARY

The present invention has been made to address the problems of the prior art systems. According to an aspect of the present invention, there is provided a method of configuring an electronic system comprising the steps of: sending a command to one or more units in the electronic system to enter into an address setting mode; generating a signal for a user to identify units that have entered the address setting mode; and setting up an address for a unit based on an input received from the user.

Advantageously, by using such a method, it is possible to associate a logical address and a physical position of each panel in a configurable storage system and any panel can be mounted at any position in the system. Moreover, more panels can be added to a single bus due to such dynamic address allocation process. Furthermore, there is no need to stock spare panels with pre-set addresses corresponding to specific physical locations as the addresses on the panels are set-up dynamically by the user at the time of assembly and/or re-configuration.

Preferably, the step of sending a command comprises including an address to be assigned to a unit in the command.

Preferably, the step of generating a signal comprises changing the state of an indicator on a unit.

Preferably, in the step of setting up an address for a unit, the input is received at the unit.

Preferably, the step of setting up an address comprises actuating a sensor on a unit by the user.

Preferably, the method further comprises changing the state of an indicator on the unit on which the sensor is actuated.

Preferably, the step of setting up an address further comprises storing the address in a memory unit.

Preferably, the method further comprises changing the state of an indicator upon completion of an address set-up for a unit.

Preferably, the method further comprises displaying the address for the user.

Preferably, the step of setting up an address further comprises the unit requesting a system controller to assign an address.

Preferably, the step of setting up an address further comprises validating an address assigned by the system controller.

According to another aspect of the invention, there is provided a computer-readable medium comprising instructions which, when executed by a computer, cause the computer to carry out the steps of the method described above.

According to yet another aspect of the invention, there is provided an electronic unit comprising: a communication module configured to communicate with a system controller to receive commands for controlling the operation of the unit; an indicator configured to indicate an operational state of the unit; and a sensor configured to initiate an address set-up for the unit.

Preferably, the unit is configured to either accept or reject a command received from the system controller based on an address specified in the command.

Preferably, the indicator is configured to change state and/or colour based on a command received from the system controller or upon actuating the sensor.

Preferably, the unit comprises a memory configured to store an address for the unit.

Preferably, the unit further comprises a display unit for displaying the address for a user.

According to yet another aspect of the invention, there is provided an electronic storage system having a plurality of drawers supported on one or more electronic units as described above.

BRIEF DESCRIPTION OF THE DRAWINGS

Embodiments of the present invention will now be described by way of example only and with reference to the accompanying drawings, in which.

DETAILED DESCRIPTION

Figure 1:
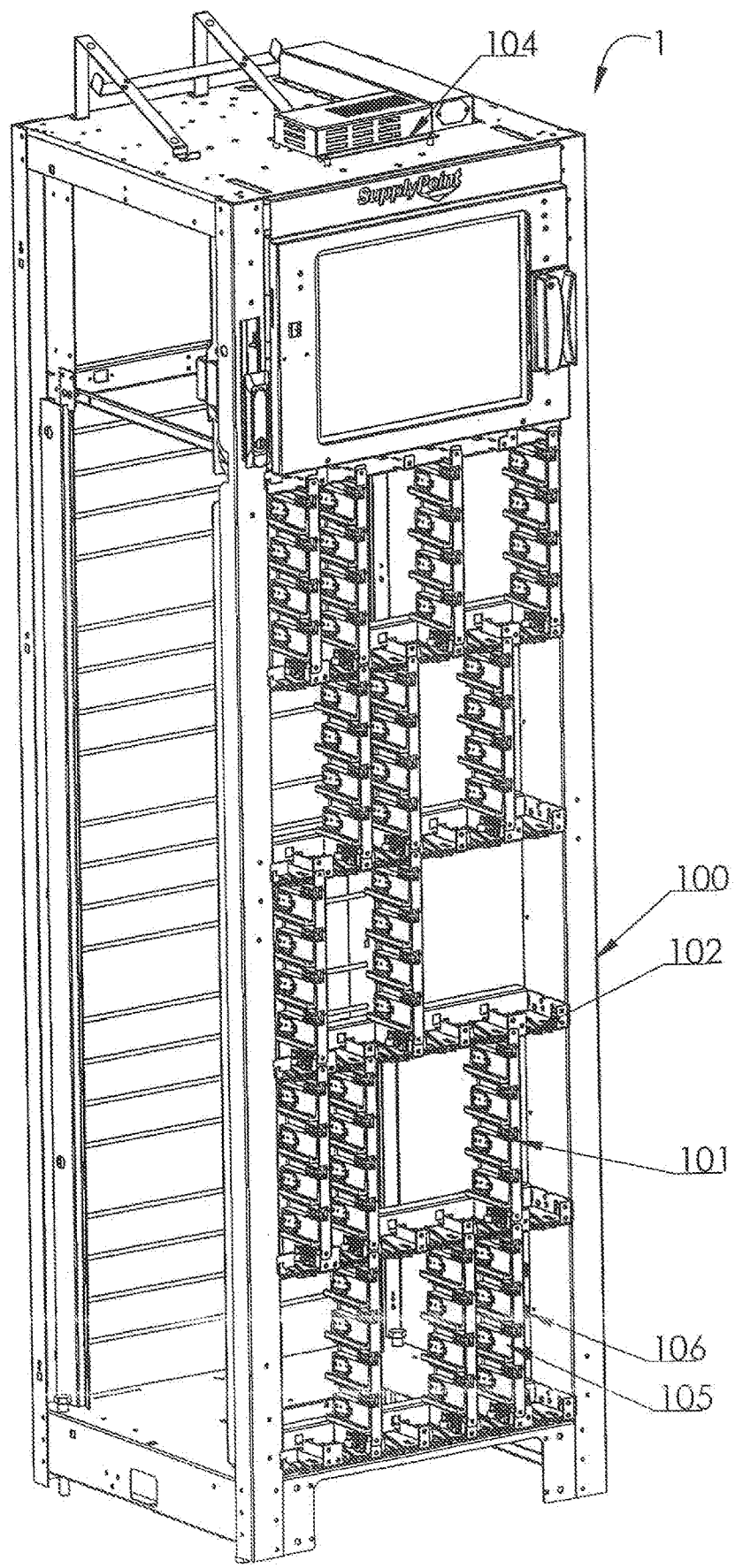
FIG. 1 is a perspective view of a storage system according to the present invention.

In the following specification, the terms front, back, rear, left, right, top, bottom, upper, lower and like terms will be used consistently with the arrangement shown in FIG. 1. In particular, the expression height corresponds to a dimension from top to bottom, width corresponds to a dimension from left to right and depth corresponds to a dimension from front to back. However, the terminology used in the description below is not limited to this. FIG. 1 shows a perspective view of a storage system 1 according to the present invention. In the system 1, a housing 100 is provided with a frame comprising a plurality of panels 101 held upright between a plurality of support beams 102 extending in the width direction of the housing 100. The panels 101 and the support beams 102 are positioned such that several drawers (not shown) stacked on top of each other can be held between a pair of two adjacent panels 101. The system 1 has a modular design, therefore it is configurable to hold drawers of varied sizes. In the present embodiment, the panels 101 can be fixed at different points on the support beams 102 to accommodate drawers of single, double, or triple width and/or height.

The housing 100 also has a system controller 104 mounted thereto. Cabling extends from the system controller 104 down channels provided in the front to circuitry provided in each of the panels 101. Although not shown, side and back plates would also be mounted to the housing 100 to prevent unauthorised access to the drawers and any control electronics.

Figure 2:
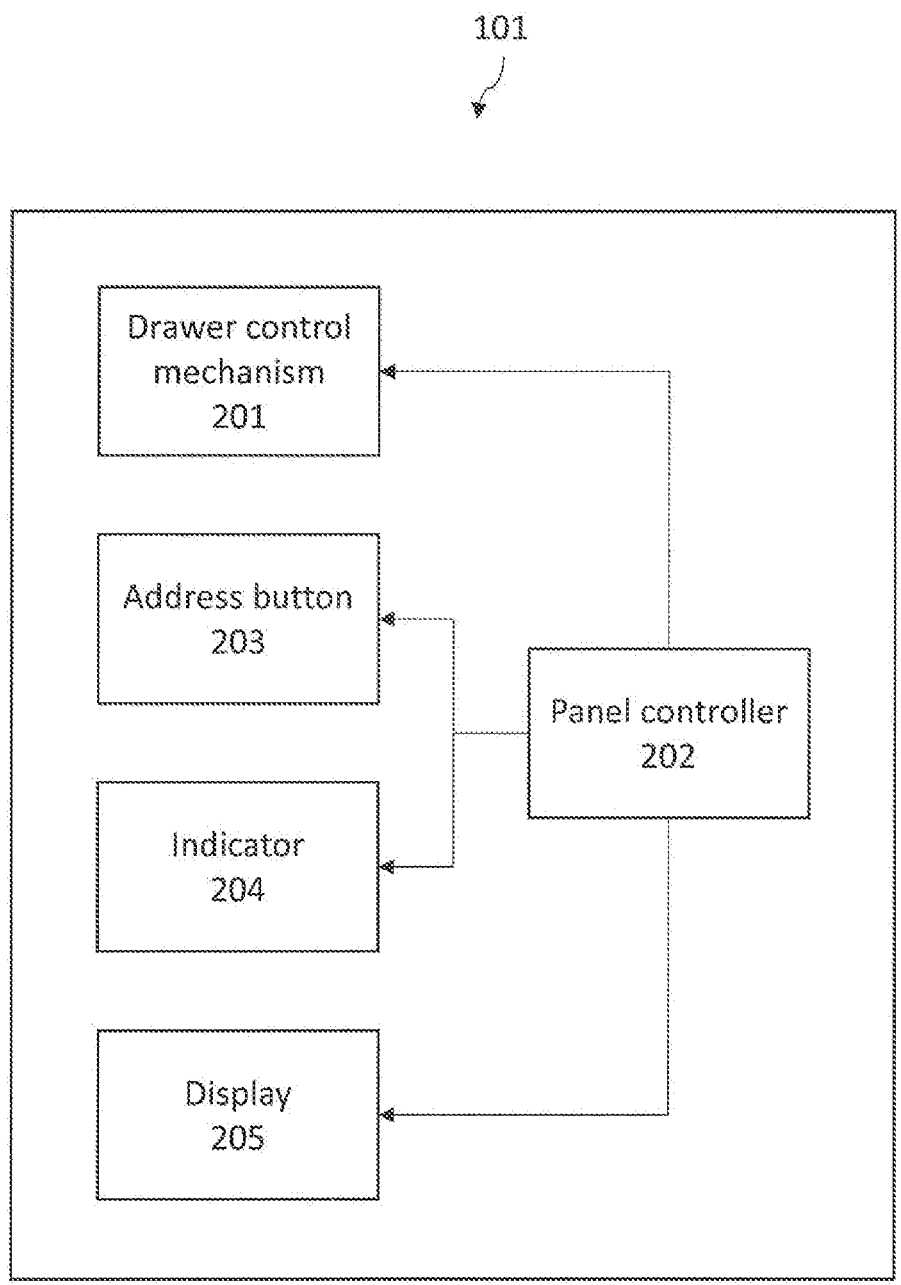
FIG. 2 is a block diagram of a panel for the storage system of FIG. 1.

Each of the panels 101 is configured to have a plurality of guide blocks 105 on one side and corresponding support blocks 106 on the other side. A drawer is held between the guide block 105 on the right-hand side panel 101 and the support block 106 on the adjacent left-hand side panel 101. In the system shown in FIG. 1, up to four standard size drawers can be held between two adjacent panels 101. It is to be understood that as the system is configurable, the guide blocks 105 and the support blocks 106 can be adjusted to support larger size drawers. The panel 101 also includes a control mechanism to monitor when the drawer is in its fully closed position, the distance the drawer moves, and the direction of movement of the drawer. The control mechanism could comprise a solenoid-flap latch arrangement and a group of sensors, which is well-known in the art. The control mechanism is controlled by a panel controller 202 (as shown in FIG. 2) built into the panel 101. The panel controller 202 is connected to the system controller 104.

FIG. 2 shows a block diagram of the panel 101. The panel 101 comprises a drawer control mechanism 201, a panel controller 202, an address button 203, an indicator 204, and a display 205. The drawer control mechanism 201 drives the drawers as explained above. Various components of the panel controller 202 and the address button 203 are explained later in the description. The indicator 204 is a visual, audio, or an audio-visual means provided on the panel 101 to indicate an operational state of the panel 101 to a user. In one embodiment, the indicator 204 is a group of LEDs which are configured to change state and/or colour based on a signal received from the panel controller 202 and/or the system controller 104. In one embodiment, the indicator 204 is a 4-digit binary LED display capable of displaying 16 unique binary codes. The display 205 is an optional screen on the panel 101 to display operating instructions and/or system messages to the user. The display 205 could be an LED or LCD screen. In one embodiment, the display 205 could be a touch screen, like that on smartphones and tablets, and can serve the functions of both the indicator 204 and the address button 203. Where provided, the display 205 can be provided in addition to or instead of the indicator 204.

Figure 3:
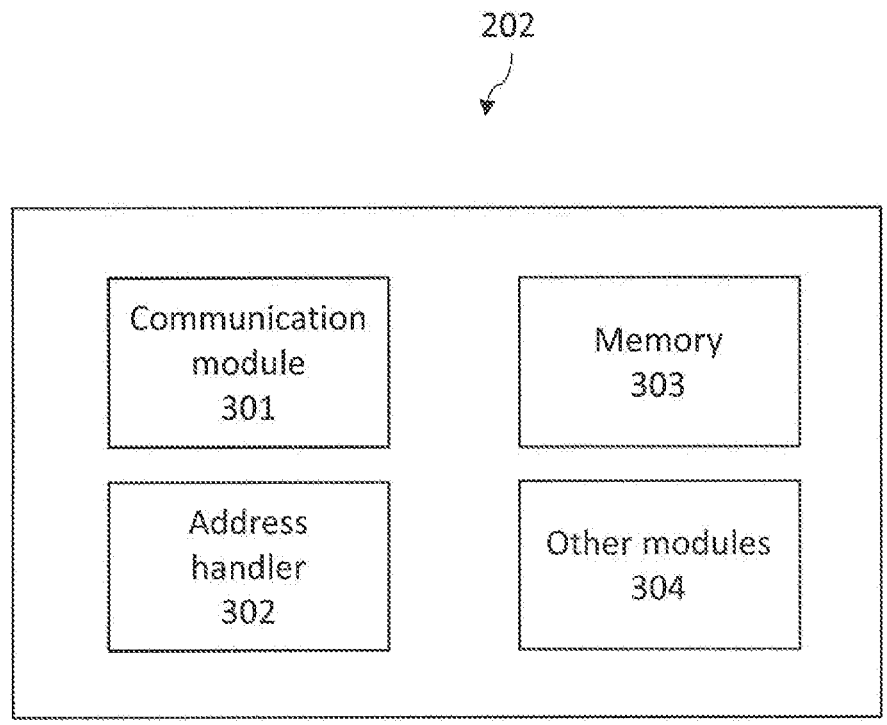
FIG. 3 is a block diagram of a panel controller for the panel of FIG. 2.

FIG. 3 shows main components of the panel controller 202. The panel controller 202 is implemented by a standard microprocessor or a microcontroller well-known in the art, which is provided with working RAM (not shown or included in memory 303 discussed below). In the present embodiment, the panel controller 202 includes a communication module 301, an address handler 302, memory 303, and other modules 304. The communication module 301 is configured to communicate with the system controller 104. The communication module 301 receives and optionally acknowledges any signal or command sent by the system controller 104 to the panel controller 202. The communication module 301 may also report an incidence or send a service request to the system controller 104. For example, if the panel controller 202 detects a malfunctioning module, it can inform the system controller 104 by sending a message via the communication module 301. The communication between the panel controller 202 and the system controller 104 could be either wired or wireless.

The address handler 302 manages the address assignment to the panel 101 from the system controller 104. In one embodiment, at the time of assembly, the panels 101 do not have any address assigned to them or they are all assigned a default address, for example, "0000" so that any panel 101 can be fitted at any location in the system 1. This makes the assembling process quicker and easier. Once the panels 101 are fitted in the system 1, each panel 101 is assigned a unique address by the system controller 104. The address handler 302 can be invoked by a command generated by the system controller 104 upon system start-up after assembly. The address can then be set-up for a desired panel 101 by pressing the address button 203 on the panel 101. The address button 203 is an example of a sensor that can be actuated by a user and can be, but is not limited to, a hard push button, a soft touch button or a touchscreen on the panel 101. The address button 203 could be located at any convenient location on the panel 101.

The memory 303 is implemented by a memory technology such as an EEPROM which can be re-programmed several thousand times as and when needed. Upon completion of address set-up for the panel 101, the address handler 302 records the assigned address for the panel 101 to the memory 303. As the memory 303 is re-programmable, the panel 101 can be re-addressed when fitted at another location in the system 1 and the new address can then be recorded in the memory 303. As discussed above, the memory 303 may also include a working memory (RAM) for the controller microprocessor, which operates in accordance with application code permanently stored in the panel controller 202. Preferably, the application is stored in non-volatile flash memory at the manufacturing stage.

The other modules 304 in the panel controller 202 are indicator controller, maintenance module, and the like. The indicator controller controls and monitors the state of the indicator 204 in response to commands from the system controller 104 and/or the pressing of the address button 203 on the panel 101. The maintenance module monitors the functioning of all other modules in the panel controller 202 and reports any issue to the system controller 104 and optionally to the user by means of the indicator 204 and/or the display 205.

Figure 4A:
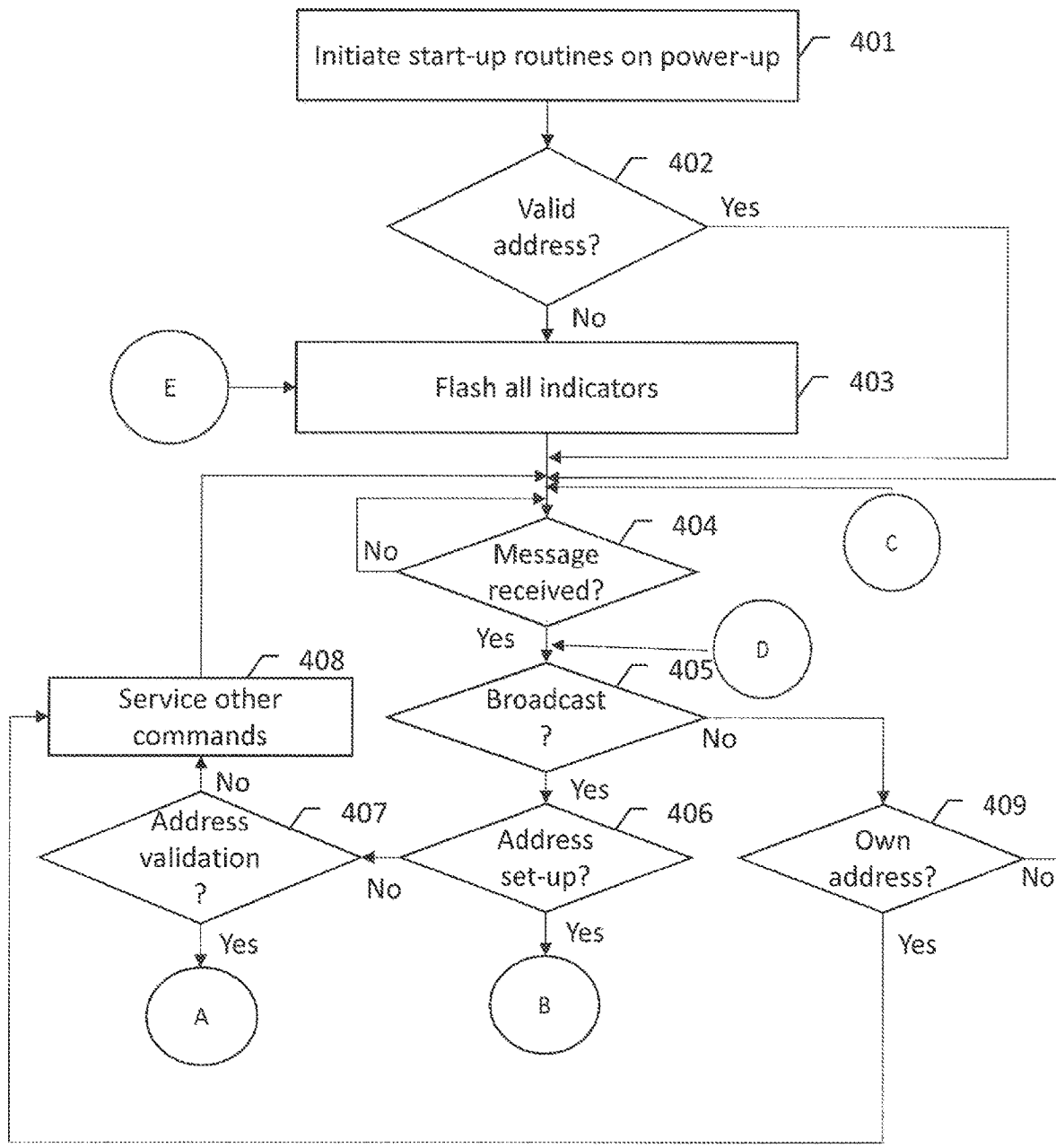
FIGS. 4A-4C are flow diagrams for a method of configuring the panels in the storage system.
Figure 4B:
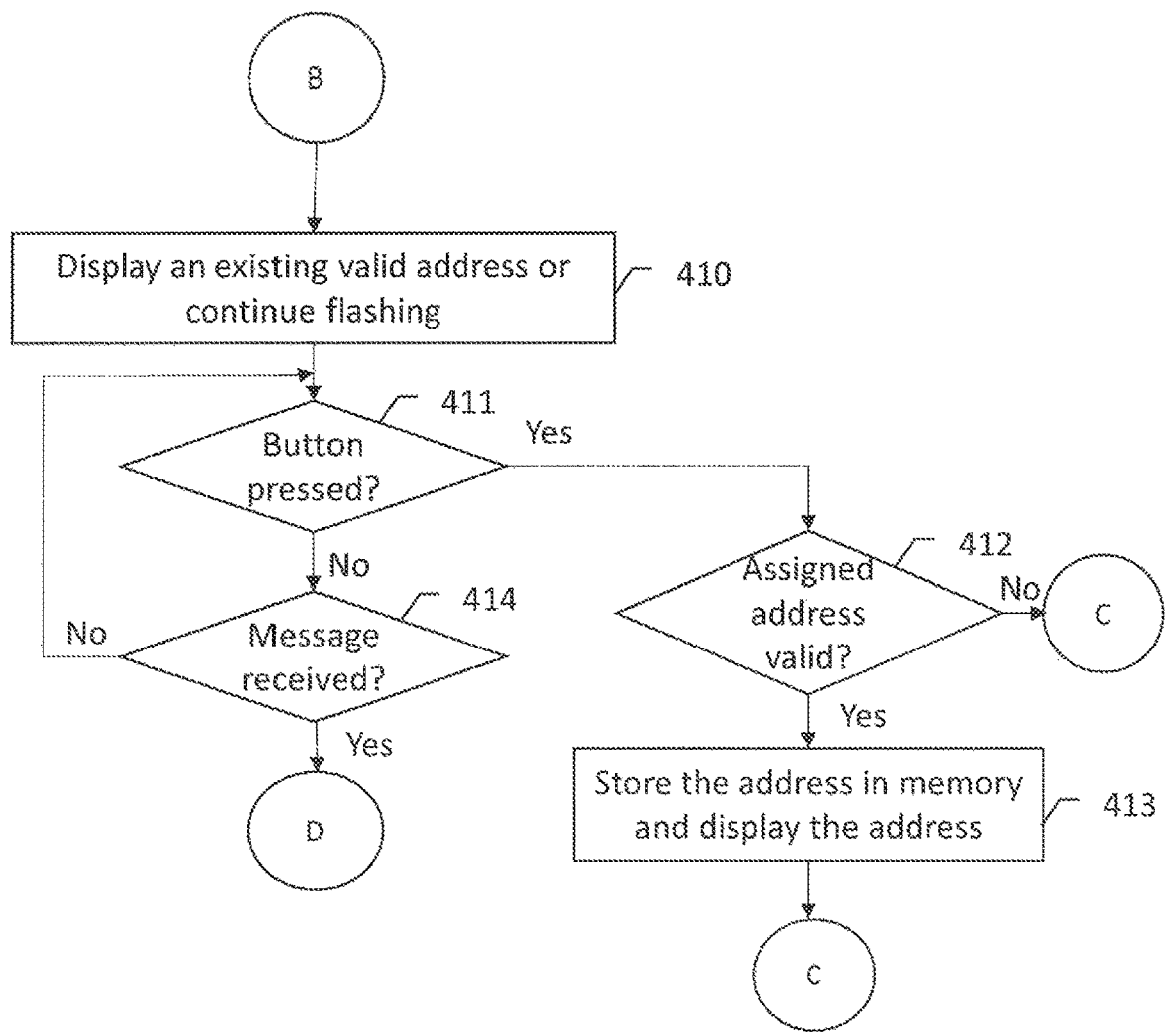
Figure 4C:
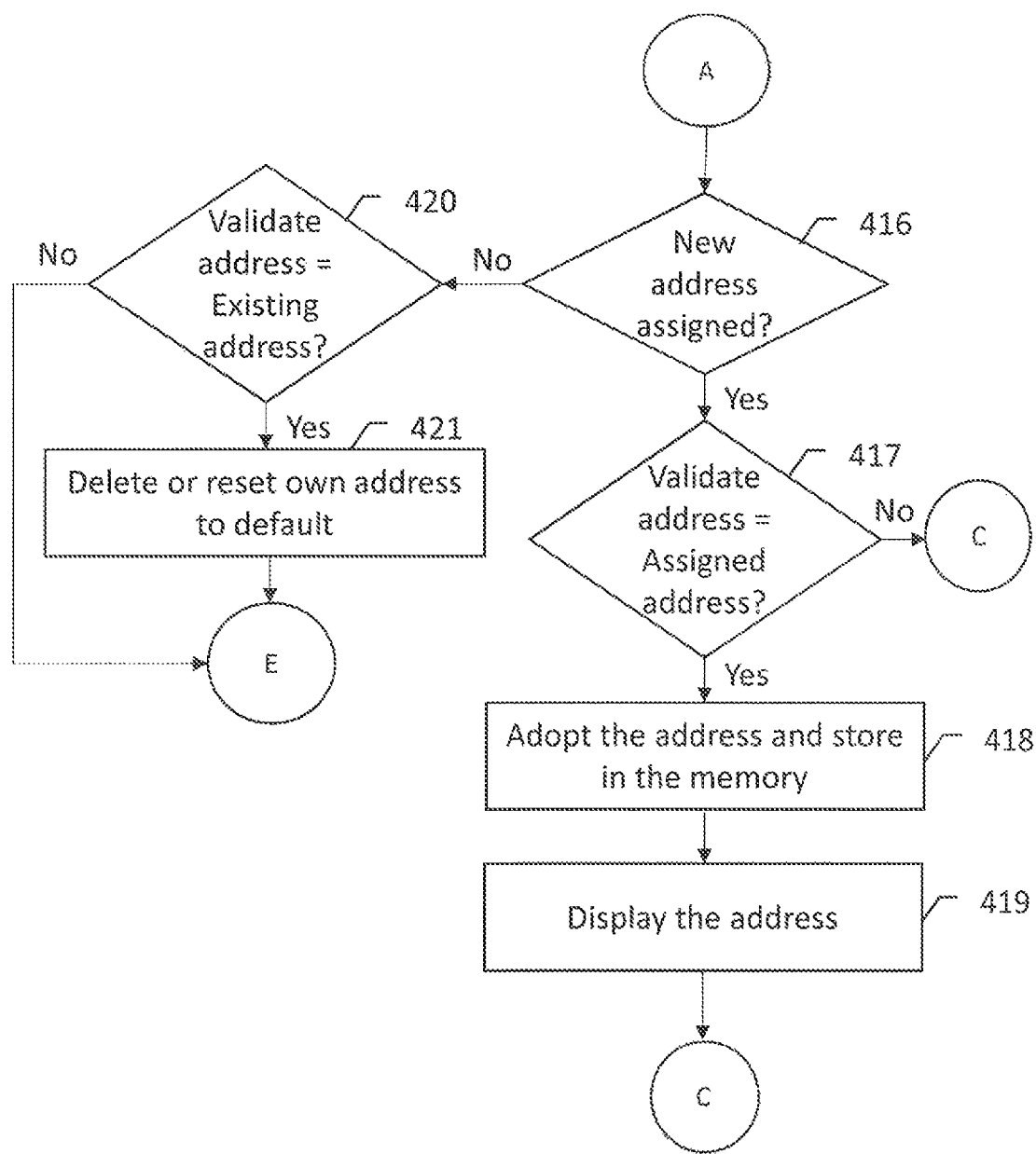

FIGS. 4A-4C show flow diagrams for a process 400 followed by each of the panel controllers 202 for configuring the respective panels 101 in the system 1. When the system 1 is first assembled, all the panels 101 have either no address stored or store a default address. On power up, at step S401, the panel controller 202 initiates start-up routines which may include testing for proper functioning of all components in the panel 101 and checking an address state of the panel 101. At step S402, the panel controller 202 checks if a valid address is associated with the panel 101. During initial set-up, no address (or a default address) is associated with the panels 101, which the panel controller 202 would not recognise as a valid address. Subsequently, at step S403, the panel controller 202 flashes all indicators 204 on the panel 101 if the panel does not have an address or only has the initial default address stored. Flashing of the indicators 204 signals to the user that no valid address has been set-up for the panel 101. Where the indicator 204 comprises several LEDs, all or a specific one of them may be flashed. Optionally, the display 205 may display a message for the user such as "no valid address exists." However, if a valid address already exists for the panel 101, the panel controller 202 skips step S403.

Next, at step S404, the panel controller 202 checks if a message is received from the system controller 104. In particular, the communication module 301 in the panel controller 202 keeps checking for any incoming communication from the system controller 104. As all the panels 101 are connected on the same bus and the system controller 104 broadcasts messages on the bus, the panel controllers 202 on all of the panels 101 receive all commands (which includes messages and other signals) from the system controller 104. Commands or messages can be global broadcast commands intended for all panels (which are called broadcast commands in the present specification) or commands or other messages intended for specific panels (which are called non-broadcast commands in the present specification—even though they are received by all panels, not all panels act on them). Both global broadcast (broadcast) message formats and panel-level (non-broadcast) message formats are hard-coded methods of addressing multiple panels.

If a message is received, then at step S405, the panel controller 202 determines if the message received is a broadcast command, which is a command intended for all panel controllers 202 in the system.

Upon determining that the message is a broadcast command, the panel controller 202 at step S406 determines if the command is for address set-up—that is, whether the command is what may be called an enumerate command. If it is, the process proceeds to step S410 explained later with reference to FIG. 4B. However, if the command is not for address set-up, the panel controller 202 at step S407 checks if the command is for address validation. Address validation is a command issued by the system controller 104 to check the validity of an address in view of existing addresses on the panels 101. If the command is determined to be for address validation, the process proceeds to step S416 explained later with reference to FIG. 4C. However, if the command is not for address validation then the panel controller 202 at step S408 services any other command issued by the system controller 104 in the message. This could be a routine health-check or system monitoring command.

On the other hand, if at step S405 the panel controller 202 determines that the message received from the system controller 104 is not a broadcast command (that is, it is a non-broadcast command), it proceeds to step S409. Non-broadcast messages from the system controller 104 can include an address of a specific panel 101 preceding an instruction for the panel to follow. At step S409, the panel controller 202 checks if the message comprises its own address. If the message is addressed to the panel 101, it services the command contained in the message at step S408 as described above. However, if the message does not include the address of the panel 101, the panel controller 202 simply ignores the message, returns to step S404 and continues to check for messages from the system controller 104.

FIG. 4B shows an address set-up process following on from step S406 in FIG. 4A. At step S410, if it has one, the panel controller 202 displays its existing valid address using the indicator 204 and/or on the display 205 for the user. For example, where the indicator 204 comprises four LEDs, the binary address is displayed by solidly lighting up the LEDs corresponding to the address. However, if no valid address exists for the panel 101, such as where there is no address or an invalid or default address is set, the panel controller 202 continues to flash the indicator 204 (for example, it flashes all the LEDs on the panel) and/or to display a message such as "no valid address set" on the display 205.

Next, at step S411, the panel controller 202 determines if the user has pressed the address button 203 on the panel 101. If a panel 101 does not have a valid address, the user can see this from the indicator 204 and/or display 205 and can press the address button 203 to set-up an address for that panel 101. The address set-up command (or enumerate command) includes an address to be assigned to the panel 101 on which the address button 203 is pressed. Put another way, the address to be assigned to the panel is included in the 'payload' of the broadcast command. In one embodiment, the user sets the address in the enumerate command by a computer connected to the system controller 104 which in turn communicates the assigned address to the address handler 302 in the panel controller 202. In a preferred embodiment, the system controller 104 includes an address generator which generates the address in the enumerate command, for example based on a set of predefined rules or simply by random number generation.

When the address button 203 is pressed, the address handler 302 in the panel controller 202 is invoked. The panel controller 202 (address handler 302) determines if the assigned address in the enumerate command is valid at step S412. A valid address is the one selected from a pre-set range of addresses that are hard-coded and are recognised as such by the panel controller 202. An address outside the range is not valid. If the assigned address is not valid, the panel controller rejects the address and moves back to step S404 in the process 400.

However, if the address is valid, then at step S413, the panel controller 202 (address handler 302) temporarily stores the assigned address in the memory 303 and displays the address for the user on the indicator 204 and/or the display 205. For example, the indicator 204 shows the new address by slowly flashing the LEDs corresponding to the address and/or the display 205 displays the address and a message such as "address set-up successful" or "address set-up in progress" for the user.

Temporarily storing the assigned address (that is, the address in the enumerate command) can be achieved in many ways, for example by setting a flag in the memory 303 to this effect. Alternatively, the assigned address may be stored only in the working RAM of the processor of the panel controller 202 and not stored in the EEPROM memory 303 at this stage.

In some embodiments, the panel controller 202 may send a message to the system controller 104 to indicate that the address button 203 has been pressed and/or the assigned address has been temporarily stored in the memory 303. The process then moves back to step S404 where the panel controller 202 waits for a new message.

On the other hand, if the address button 203 is not pressed by the user, the panel controller 202 at step S414 checks if another message has been received from the system controller 104. If a message is received from the system controller 104, the process moves back to step S405. The system controller 104 may also turn off the panel controller 202 if no input is received from the user within a pre-set time-out period.

The system controller 104 having invoked the address handler 302 in the panel controller 202, and the user having pressed the address button 203, may now issue a validate address broadcast command. As explained above, in step S407 each panel controller 202 establishes whether the received broadcast command is an address validation command. If it is, the panel controller 202 carries out an address validation process. FIG. 4C shows the steps in an address validation process following on from step S407 in FIG. 4A. At step S416, the panel controller 202 checks if the panel 101 has just been enumerated—that is, whether the assigned address has been temporarily stored in the memory 303. If so, then at step S417, the panel controller 202 checks if the validate address specified in the validate address message from the system controller 104 matches the assigned (temporarily stored) address of the panel 101. If it does, the panel controller 202 adopts that address (thereby validating it) and stores it in the memory 303 at step S418. For example, the panel controller may toggle the flag indicating temporary storage, or it may transfer the address from working RAM to the EEPROM. At step S419, the panel controller 202 displays the address on the indicator 204 and/or the display 205 and then returns to step S404. Optionally, the indicator 204 turns to a solid colour and a message such as "address validated" is displayed for the user. However, if the validate address does not match the assigned address in step S417, the panel controller 202 rejects the address and goes back to step S404.

On the other hand, if it is determined in step S416 that no new address has been assigned to the panel 101, the process proceeds to step S420. At step S420, the panel controller 202 checks if the validate address included in the validate address command matches the pre-existing address on the panel 101. If so, the panel controller 202 interprets it to be an address conflict and deletes its own address or resets its address to default at step S421 and reverts to step S403. This situation occurs when the user or the system controller 104 erroneously assigns the same address to two or more panels 101. To avoid this, the panel controller 202 is configured to reject an assigned address where there is a conflict.

For initial set-up, the same process 400 continues for all the panels 101 until all the panels 101 have been assigned a unique address. When the system 1 is re-configured, i.e. one or more panels 101 are moved or new panels are added in the system 1, the system controller 104 broadcasts an address set-up command to all the panels 101. However, only the new panels or the moved panels with no address need have their addresses set.

The panel 101 with the panel controller 202 of the present invention has many advantages. Firstly, the logical address and the physical position of each panel 101 can be associated and any panel can be put in any position in the system 1. Moreover, with the elimination of jumpers, more panels can be added to a single bus. In fact, the entire system can use a single bus with this arrangement. Furthermore, there is no need to stock spare panels with pre-set addresses corresponding to specific physical locations as the addresses on the panels 101 are set-up dynamically by the user at the time of assembly and/or re-configuration. Moreover, with a conflict resolution routine built-in the system controller 104 and the panel controller 202, it is ensured that unique addresses are assigned for all the panels 101.

The system described above can be used in several other types of storage and non-storage systems with distributed controllers. For example, it can be used on library book shelves or modular telecoms equipment with configurable electronic modules. The features such as the display 205 are optional and so is the control mechanism for controlling the drawers. Moreover, the system controller 104 and the panel controller 202 could work either independently or in conjunction to set-up the address for the panels 101.

In the described embodiment, the panel controller 202 temporarily stores the assigned address until a subsequent validation process is carried out and the address is confirmed. However, this is not essential, and the panel controller 202 may store the address properly (that is, not on a temporary basis). The subsequent validation check is therefore optional.

Moreover, in the described embodiment, the assigned address is included in the enumeration command. However, this is not essential, and the system controller 104 can send the address to be assigned in a further command after the address button/enumeration button 203 has been pressed.

The foregoing description of illustrated embodiments of the present invention, including what is described in the abstract, is not intended to be exhaustive or to limit the invention to the precise forms disclosed herein. While specific embodiments of the invention are described herein for illustrative purposes only, various equivalent modifications are possible within the scope of the present invention, as those skilled in the relevant art will recognise and appreciate. As indicated, these modifications may be made to the present invention in light of the foregoing description of illustrated embodiments of the present invention and are to be included within the scope of the present invention.

The invention claimed is:

1. A method of configuring a storage system comprising the steps of:
sending a command including an address to one or more units in the storage system to enter an address setting mode;

generating a signal for a user to identify units that have entered the address setting mode; and setting up an address for a unit based on an input received from the user, wherein the address setting mode includes an address conflict check, and wherein when an address conflict is detected, a pre-existing address of the unit is reset to a default address.

2. A method according to claim 1, wherein the step of sending a command comprises including an address to be assigned to a unit in the command.

3. A method according to claim 1, wherein the step of generating a signal comprises changing the state of an indicator on a unit.

4. A method according to claim 1, wherein the input is received at the unit.

5. A method according to claim 1, wherein the step of setting up an address comprises actuating a sensor on a unit by the user.

6. A method according to claim 5, further comprising changing the state of an indicator on the unit on which the sensor is actuated.

7. A method according to claim 1, wherein the step of setting up an address further comprises storing the address in a memory unit.

8. A method according to claim 1, further comprising changing the state of an indicator upon completion of an address set-up for a unit.

9. A method according to claim 1, further comprising displaying the address for the user.

10. A method according to claim 1, wherein the step of setting up an address further comprises the unit requesting a system controller to assign an address.

11. A method according to claim 1, wherein the step of setting up an address further comprises validating an address assigned by the system controller.

12. A method according to claim 1, wherein the address conflict check detects the address conflict if the address included in the command matches the pre-existing address on the unit.

13. A non-transitory computer-readable medium comprising instructions which, when executed by a computer, cause the computer to carry out the steps of the method of claim 1.

14. An electronic unit for a storage cabinet comprising:
one or more microprocessors,
a panel controller configured to communicate with a system controller to receive commands for controlling the operation of the unit;
an indicator configured to indicate an operational state of the unit; and
an address button configured to initiate an address set-up for the unit,
wherein the panel controller is configured to conduct an address conflict check, and
wherein when an address conflict is detected, a pre-existing address of the unit is reset to a default address.

15. An electronic unit according to claim 14, wherein the unit is configured to either accept or reject a command received from the system controller based on an address specified in the command.

16. An electronic unit according to claim 14, wherein the indicator is configured to change state and/or colour based on a command received from the system controller or upon actuating the sensor.

17. An electronic unit according to claim 14, wherein the unit comprises a memory configured to store an address for the unit.

18. An electronic unit according to claim 14, further comprising a display unit for displaying the address for a user.

19. An electronic storage system having a plurality of drawers supported on at least one electronic unit, the at least one electronic unit comprising:
one or more microprocessors,
a panel controller configured to communicate with a system controller to receive commands for controlling the operation of the unit;
an indicator configured to indicate an operational state of the unit; and
an address button configured to initiate an address set-up for the unit,
wherein the panel controller is configured to conduct an address conflict check, and
wherein when an address conflict is detected, a pre-existing address of the unit is reset to a default address.

* * * * *